US008943121B2

(12) United States Patent
Inoue

(10) Patent No.: US 8,943,121 B2
(45) Date of Patent: *Jan. 27, 2015

(54) COMMUNICATION ACROSS AN OVERLAY NETWORK

(75) Inventor: Takuya Inoue, Tokai (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 415 days.

This patent is subject to a terminal disclaimer.

(21) Appl. No.: 13/361,190

(22) Filed: Jan. 30, 2012

(65) Prior Publication Data

US 2012/0222080 A1 Aug. 30, 2012

(30) Foreign Application Priority Data

Feb. 28, 2011 (JP) ................................. 2011-041617

(51) Int. Cl.
G06F 15/16 (2006.01)
G06F 15/173 (2006.01)
H04N 7/173 (2011.01)
H04M 11/00 (2006.01)
H04L 12/743 (2013.01)

(52) U.S. Cl.
CPC ................................. H04L 45/7453 (2013.01)
USPC ............ 709/201; 709/238; 725/118; 455/403

(58) Field of Classification Search
None
See application file for complete search history.

(56) References Cited

U.S. PATENT DOCUMENTS 6,738,981 B1 * 5/2004 Tonnby et al. ................... 725/98
7,409,461 B2 * 8/2008 Sundarraj et al. ............. 709/242
7,428,723 B2 * 9/2008 Greene et al. ................. 717/103
7,694,011 B2 * 4/2010 O'Rourke et al. ............ 709/238
7,730,207 B2 * 6/2010 Zhang et al. .................. 709/242
7,738,456 B2 * 6/2010 Toebes et al. ................. 370/392

(Continued)

FOREIGN PATENT DOCUMENTS

JP  A-2006-197400  7/2006
JP  A-2006-352797  12/2006

(Continued)

OTHER PUBLICATIONS

Apr. 16, 2013 Office Action issued in Japanese Patent Application No. 2011-041617 (with translation.

(Continued)

*Primary Examiner* — Ranodhi Serrao
(74) *Attorney, Agent, or Firm* — Oliff PLC

(57) ABSTRACT

An information communication system of an overlay network includes: a first apparatus requesting the content; a second apparatus storing the content; and a third apparatus including: a first reception unit receiving a retrieval message transmitted from the first apparatus, the retrieval message including content identification information and location information; a storage unit storing the apparatus identification information of the second apparatus and the content identification information of the content stored in the second apparatus; and a transmission unit transmitting the apparatus identification information. The second apparatus includes: a second reception unit receiving the apparatus identification information from the third apparatus; and a control unit allowing the first apparatus to acquire the content stored in the second apparatus if the apparatus identification information received by the second reception unit matches the apparatus identification information of the second apparatus.

9 Claims, 10 Drawing Sheets

(56) References Cited

U.S. PATENT DOCUMENTS

| | | | |
|---|---|---|---|
| 7,743,411 B2* | 6/2010 | Ying et al. | 726/15 |
| 2002/0174247 A1* | 11/2002 | Shen | 709/238 |
| 2003/0212821 A1* | 11/2003 | Gillies et al. | 709/238 |
| 2007/0283043 A1 | 12/2007 | Kiyohara et al. | |
| 2008/0144636 A1 | 6/2008 | Ushiyama et al. | |
| 2008/0294785 A1 | 11/2008 | Ushiyama | |
| 2009/0180493 A1 | 7/2009 | Hirano et al. | |
| 2010/0023593 A1 | 1/2010 | Matsuo | |
| 2010/0332626 A1* | 12/2010 | Jonsson et al. | 709/220 |

FOREIGN PATENT DOCUMENTS

| | | |
|---|---|---|
| JP | A-2007-53662 | 3/2007 |
| JP | A-2008-294627 | 12/2008 |
| JP | A-2010-28551 | 2/2010 |
| WO | WO 2008/041421 A1 | 4/2008 |

OTHER PUBLICATIONS

Office Action issued in Japanese Patent Application No. 2011-041617 mailed Feb. 5, 2013 (with translation).

* cited by examiner

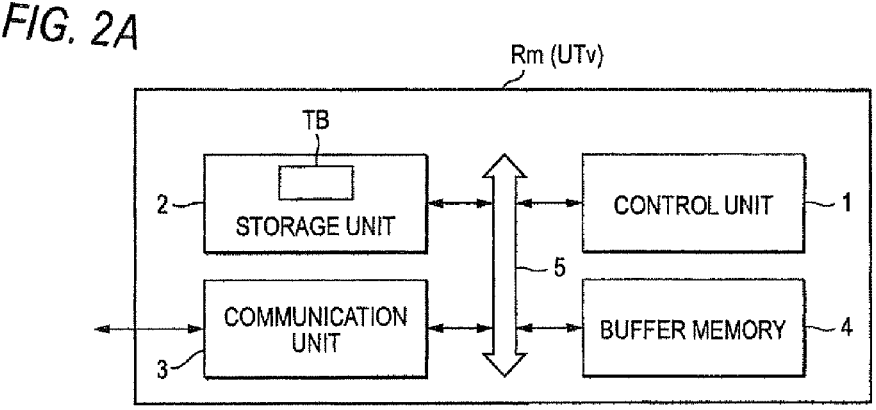

COMMUNICATION ACROSS AN OVERLAY NETWORK

CROSS-REFERENCE TO RELATED APPLICATION

This application is based upon and claims the benefit of priority of Japanese Patent Application No. 2011-041617 filed on Feb. 28, 2011, the contents of which are incorporated herein by reference in its entirety.

BACKGROUND

The present disclosure relates to an information communication system using an overlay network that is formed by a plurality of node apparatuses connected to a network. In the below descriptions, the 'node apparatus' is referred to as a 'node.'

In recent years, a technology has been developed which delivers content such as movie and moving picture through an overlay network that is formed by a plurality of nodes connected to a network. In the overlay network, the content is distributed and stored in each of the nodes present in the overlay network. The respective nodes share the content among the nodes and transmit and receive the same each other.

The nodes present in the overlay network include a node that is typically fixed at one place, such as a desktop personal computer. Such node is referred to as a fixed node. In the overlay network, a node that is carried and moved by a user, such as portable telephone and note-type personal computer is also included in addition to the fixed node. Such node is referred to as a mobile node. An IP (Internet Protocol) address of the mobile node is changed as a connection destination is changed due to the moving.

SUMMARY

When the IP address of the mobile node storing the content therein is changed, it is not possible to retrieve and acquire the content of the mobile node from the other nodes in the overlay network. As the related art, a technology has been suggested which, when the IP address of the mobile node is changed, notifies all the other nodes present in the overlay network of the IP address after the change. However, the related art has a problem in that since the IP address after the change is notified to all the other nodes present in the overlay network, an amount of messages is increased in the overlay network, thereby occupying the network. Meanwhile, in recent circumstances that the number of the mobile nodes is increased and a moving range of the node is expanded, the IP address is also frequently changed, so that the amount of messages is increased.

The present disclosure has been made to solve the above problems. One of an objects of an aspect of the present disclosure is to provide an information communication system, an information processing apparatus, an information communication method and a program capable of acquiring content without increasing an amount of messages in an overlay network even when an IP address of a mobile node storing the content therein is changed.

The aspect of the present disclosure provides the following arrangements:

An information communication system in which an overlay network is configured by a plurality of information processing apparatuses capable of communicating with each other through a network, the information processing apparatus comprises a controller configured to control the information processing apparatus, and content is distributed and stored in the plurality of information processing apparatuses, and apparatus identification information that identifies the information processing apparatuses is allotted to each of the information processing apparatuses, the plurality of the information communication apparatuses comprising:

a first information processing apparatus configured to request the content; a second information processing apparatus configured to store the content; and
a third information processing apparatus:
wherein the controller of the third information processing apparatus controls to;
receive a retrieval message transmitted from the first information processing apparatus, the retrieval message including content identification information for identifying the content in the overlay network and location information indicating a location of the first information processing apparatus on the overlay network;
associate and store the apparatus identification information of the second information processing apparatus and the content identification information of the content stored in the second information processing apparatus in a storage unit; and
transmit the apparatus identification information, which is stored in the storage unit in association with the content identification information included in the received retrieval message, and
wherein
the controller of the second information processing apparatus controls to;
receive the apparatus identification information from the third information processing apparatus;
determine whether the received apparatus identification information matches the apparatus identification information of the second information processing apparatus; and
allow the first information processing apparatus to acquire the content stored in the second information processing apparatus in response to determining that the received apparatus identification information matches the apparatus identification information of the second information processing apparatus.

An information communicating apparatus provided in information communication system in which an overlay network is configured by a plurality of information processing apparatuses capable of communicating with each other through a network, and content is distributed and stored in the plurality of information processing apparatuses, and apparatus identification information that identifies the information processing apparatuses is allotted to each of the information processing apparatuses, the plurality of information processing apparatuses comprising: a first information processing apparatus configured to request the content; and a second information processing apparatus including: a storage unit configured to associate and store the apparatus identification information of the information communicating apparatus and content identification information for identifying the content, which is stored in the information communicating apparatus, in the overlay network; a first reception unit configured to receive a retrieval message from the first information processing apparatus, the retrieval message including the content identification information and location information indicating a location of the first information processing apparatus on the overlay network; and a transmission unit configured to transmit, to one of the first information processing apparatus and the information communicating apparatus, the apparatus identification information of the apparatus identification information stored in the storage means, which corresponds to the content identification information included in the retrieval message received by the first reception unit, the information communicating apparatus comprising a controller configured to:

receive the apparatus identification information from the second information processing apparatus;

determine whether the apparatus identification information received by the second reception unit matches the apparatus identification information of the second information processing apparatus; and allow the first information processing apparatus to acquire the content stored in the second information processing apparatus in response to the controller determining that the apparatus identification information received by the controller matches the apparatus identification information of the second information processing apparatus.

A non-transitory computer readable recording medium storing a program for an information processing system in which an overlay network is configured by a plurality of information processing apparatuses capable of communicating with each other through a network, the information processing apparatus comprises a controller configured to control the information processing apparatus, and content is distributed and stored in the plurality of information processing apparatuses, apparatus identification information that identifies the information processing apparatuses is allotted to each of the information processing apparatuses, the plurality of information processing apparatuses comprises a first information processing apparatus that requests the content a second information processing apparatus that stores the content, and a third information processing apparatus, the controller of the third information processing apparatus controls to: associate and store, in a storage unit, the apparatus identification information of the second information processing apparatus and content identification information for identifying the content, which is stored in the second information processing apparatus, in the overlay network; receive a retrieval message from the first information processing apparatus, the retrieval message including the content identification information and location information indicating a location of the first information processing apparatus on the overlay network; and transmit the apparatus identification information of the apparatus identification information stored in the storage unit, which corresponds to the content identification information included in the retrieval message received by the first reception means, to the first information processing apparatus or second information processing apparatus, the program causing a computer of the second information processing apparatus to execute:

receiving the apparatus identification information from the third information processing apparatus;

determining whether the received apparatus identification information matches the apparatus identification information of the second information processing apparatus, and allowing the first information processing apparatus to acquire the content stored in the second information processing apparatus in response to the determination that the received apparatus identification information matches the apparatus identification information of the second information processing apparatus.

An information communication method that is executed in an information processing system in which an overlay network is configured by a plurality of information processing apparatuses capable of communicating with each other through a network, and content is distributed and stored in the plurality of information processing apparatuses, apparatus identification information that identifies the information processing apparatuses is allotted to each of the information processing apparatuses, the plurality of information processing apparatuses comprises a first information processing apparatus that requests the content a second information processing apparatus that stores the content, and a third information processing apparatus which includes a storage unit configured to associate and store the apparatus identification information of the second information processing apparatus and the content identification information of the content stored in the second information processing apparatus, the method comprising:

receiving, by the third information processing apparatus, a retrieval message that is transmitted from the first information processing apparatus and includes content identification information for identifying the content in the overlay network and location information indicating a location of the first information processing apparatus on the overlay network;

transmitting, by the third information processing apparatus, the apparatus identification information, which is stored in the storage means in association with the content identification information included in the received retrieval message, to the first information processing apparatus or second information processing apparatus;

receiving, by the second information processing apparatus, the apparatus identification information from the third information processing apparatus;

determining, by the second information processing apparatus, whether the received apparatus identification information matches the apparatus identification information of the second information processing apparatus; and allowing the first information processing apparatus to acquire the content stored in the second information processing apparatus, the control process being executed in the second information processing apparatus in response to the determination that the received apparatus identification information matches the apparatus identification information of the second information processing apparatus.

BRIEF DESCRIPTION OF DRAWINGS

FIGS. 2A and 2B show an outline configuration of a node according to an exemplary embodiment, in which FIG. 2A is a block diagram showing an outline configuration of a router and the like according to an exemplary embodiment and FIG. 2B shows an example of a transmission source table according to an exemplary embodiment.

FIGS. 3A to 3C are a flowchart (I) showing processing in each node according to an exemplary embodiment, in which FIG. 3A is a flowchart showing processing as a user node according to an exemplary embodiment, FIG. 3B is a flowchart showing processing as a root node according to an exemplary embodiment and FIG. 3C is a flowchart showing processing as a storage node according to an exemplary embodiment.

FIGS. 4A and 4B are a flowchart (II) showing processing in each node according to an exemplary embodiment, in which FIG. 4A is a flowchart showing transmission source table update processing according to an exemplary embodiment and FIG. 4B is a flowchart showing address change message transmission processing according to an exemplary embodiment.

FIGS. 5A to 5C are a flowchart (III) showing processing in each node according to an exemplary embodiment, in which FIG. 5A is a flowchart showing address change message reception processing according to an exemplary embodiment, FIG. 5B is a flowchart showing address change information reception processing according to an exemplary embodiment and FIG. 5C is a flowchart showing processing as a supporter node according to an exemplary embodiment.

DESCRIPTION OF EXEMPLARY EMBODIMENTS

Hereinafter, exemplary embodiments will be described with reference to the drawings. The following exemplary embodiments show a delivery system that delivers content to which the aspect of the present disclosure is applied.

(1) Configuration of Delivery System

Figure 1:
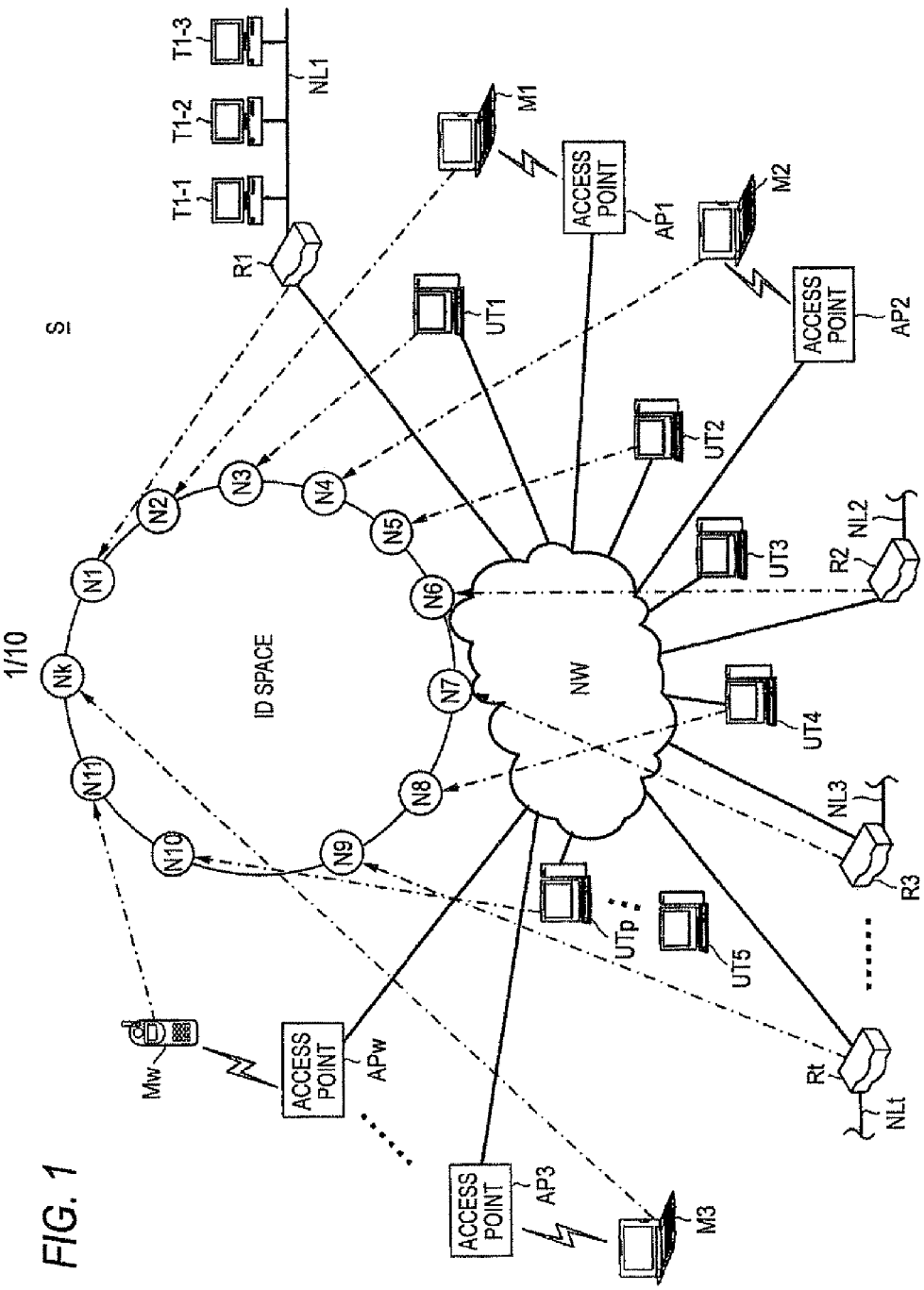
FIG. 1 shows an outline configuration of a delivery system according to an exemplary embodiment.

First, a configuration of a delivery system according to an exemplary embodiment is described with reference to FIG. 1. As shown in FIG. 1, a delivery system S according to an exemplary embodiment includes routers Rm (m: natural number from 1 to t), user terminals UTv (v: natural number from 1 to p), mobile terminals Mq (q: natural number from 1 to w) and the like. The routers Rm are connected to a network NW consisting of the internet and the like. The router Rm is a firewall having a router function, a broadband router and the like, for example. The network NW is the WAN (Wide Area Network) and the like, for example. The network NW is built by an IX (Internet eXchange), an ISP (Internet Service Provider), a DSL (Digital Subscriber Line) line company apparatus, an FTTH (Fiber To The Home) line company apparatus, a communication line and the like. The network NW may be a dedicated network of the delivery system S. The user terminal UTv is a desktop personal computer that is provided in a predetermined place such as user's home, for example. The user terminal UTv can connect to the network NW by using an IP address that is allotted by an internet service provider server (not shown), for example. The mobile terminal Mq is an information terminal such as moveable personal computer or portable telephone that is carried by a user, for example. The mobile terminal Mq is wirelessly connected to an access point APq that is provided in a predetermined place such as fast food store, for example. In this case, the mobile terminal Mq and the access point APq are connected by the network such as wireless LAN (Local Area Network), for example. In the meantime, the respective access points APq and the like are wired connected to the network NW, for example. The mobile terminal Mq can connect to the network NW via the access point APq and the like. Like the user terminal UTv, the mobile terminal Mq can connect to the network NW by using an IP address that is allotted by the internet service provider server. The mobile terminal Mq may directly connect to the network NW without via the access point APq. In this case, the mobile terminal Mq is also connected to the network NW by using an IP address that is unique for the corresponding mobile terminal Mq.

As shown in FIG. 1, the respective routers Rm are connected with base networks NLm for each router Rm. The base network NLm is also a network such as LAN, for example. Each router Rm is connected to one or more terminals Tm-s (s: natural number) through the base network NLm. The router Rm is a relay device that relays IP packets between the network NW and the base network NLm. The terminal Tm-s can reproduce content that is delivered from the router Rm. Meanwhile, in FIG. 1, parts of the terminals Tm-s are not shown.

In the routers Rm and the user terminals UTv shown in FIG. 1, IP addresses allotted to the routers Rm and the user terminals UTv may be changed in some cases. For example, for an IPv4 (Internet Protocol version 4), an IP address is generally allotted by a DHCP (Dynamic Host Configuration Protocol) server. At this time, when a lease term is set for the allotted IP address, the IP address may be changed after the lease term. For an IPv6 (Internet Protocol version 6), an IP address is automatically allotted even when there is no DHCP server. Also in this case, if the same IP address is continuously used, since a problem is caused regarding the security, the IP address is periodically changed in some cases. In the meantime, the IP address of the mobile terminal Mq is allotted by the access point APq to which the mobile terminal Mq is connected, for example. Accordingly, in addition to the case where the IP addresses are changed in the router Rm and the user terminal UTv, even when the mobile terminal Mq is moved between the different access points APq, the IP address allotted to the mobile terminal Mq is also changed due to the moving. Like this, compared to the router Rm and the user terminal UTv, the IP address allotted to the mobile terminal Mq is changed more frequently.

(2) Configuration and Operation Outlines of Overlay Network

In the below, configuration and operation outlines of the overlay network according to an exemplary embodiment are described with reference to FIG. 1. In the delivery system S, the overlay network NW for delivering content is established on the network NW. The overlay network ON is a logical network that configures a virtual link. As shown with dashed-dotted line in FIG. 1, the overlay network ON is formed by participations of the routers Rm, the user terminals UTv and the mobile terminals Mq configuring the delivery system S. In the below descriptions, the router Rm, the user terminal UTv and the mobile terminal Mq are collectively referred to as 'node Nn (n: natural number from 1 to k). In the below descriptions, the router Rm and the user terminal UTv are fixed nodes. The mobile terminal Mq is a mobile node. The overlay network ON is realized by a specific algorithm, for example an algorithm using a distributed hash table. The distributed hash table is referred to as 'DHT (Distributed Hash Table)'. In the below, the node Nn is simply referred to as a 'node.' In a routing table using the DHT, node IDs, IP addresses and port numbers of the predetermined number of nodes of all nodes participating in the overlay network ON are described. Here, the node ID is inherent identification information that distinguishes a node from a plurality of nodes participating in the overlay network ON. The node ID, the IP address and the port number of the node are referred to as 'node information' of the node. The 'participation in the overlay network ON' means that a node operates at a state in which it can transmit and receive a variety of messages to and from the other nodes, based on the routing table using the DHT. By participating in the overlay network ON, each node can transmit and receive a message to and from the other nodes through the overlay network ON. Here, the 'transmission and reception of a message through the overlay network ON' means that a message is transmitted and received among the nodes Nn participating in the overlay network ON. Since the routing table using the DHT is well known in US2007/283043(A1), for example, the detailed descriptions thereof are omitted. The nodes participating in the overlay network ON may include a network device having an information relay function such as proxy server, load balancer, web accelerator and the like as well as the router Rm, the user terminal UTo and the mobile terminal Mq. As the node, a server such as cache server and edge server may be used. In the below descriptions, when collectively referring to the router Rm, the user terminal UTo and the mobile terminal Mq, the 'router Rm and the like' are mentioned.

In the exemplary embodiment, the router Rm normally participates in the overlay network ON, as the fixed node. Here, the 'normal participation' means that the router Rm participates in the overlay network ON without leaving the overlay network, except for cases where the router is out of order or under maintenance. In the meantime, the user terminal UTv and the mobile terminal Mq are nodes that cannot be said to normally participate in the overlay network ON necessarily. The user terminal UTv or mobile terminal Mq participates in the overlay network ON only during predetermined time, for example only when the user uses the corresponding user terminal UTv or mobile terminal Mq. Accordingly, the user terminal UTv or mobile terminal Mq repeats the participation and secession in and from the overlay network ON. That is, the user terminal UTv or mobile terminal Mq participates or secedes in or from the overlay network ON at any timing. In the user terminal UTv, the IP address thereof may be changed whenever the user terminal participates in the overlay network ON. In the mobile terminal Mq, as described above, the IP address thereof may be changed whenever the access point APq is changed, in addition to the case of the user terminal UTv. In the exemplary embodiment, the router Rm, the user terminal UTv or mobile terminal Mq is installed with a program that causes the corresponding node to execute control processing. In addition to the router Rm and the like, a device that is connected to the network NW all the time in each home may be installed with a program that causes the device to execute control processing as a node.

A variety of contents having different contents are distributed and stored in the plurality of nodes participating in the overlay network ON. The contents stored in the nodes are assigned with content IDs, respectively. The content ID is inherent identification information that distinguishes content from a plurality of contents stored in the nodes on the overlay network ON. The node ID and the content ID are created on the overlay network ON by a common hash function, for example.

Here, the node that stores therein the content is referred to as a 'storage node.' In the exemplary embodiment, all of the router Rm, the user terminal UTv and the mobile terminal Mq may become storage nodes. Information indicating a location of content is stored, as index information, in a node that manages the location of the content. The node that manages a location of content is referred to as a 'root node.' In the exemplary embodiment, the index information includes a set of a node ID of a storage node that stores therein content and a content ID of the content. That is, the root node stores the node ID of the storage node and the content ID of the content in association with each other. This is different from the conventional index information described in US2007/283043 (A1), for example. The root node is defined so that it becomes a node having a node ID closest to the content ID. The node ID closest to the content ID is a node ID in which upper digits of the ID match most those of the content ID.

In some cases, a node may acquire predetermined content from the storage node through the overlay network ON. For example, a case may be exemplified in which a node N1 having received a request for predetermined content from a terminal T1-1 does not preserve the corresponding content. In the example shown in FIG. 1, the node N1 is a router R1. In this case, the node N1 first executes retrieval processing of retrieving a location of predetermined content stored in a storage node on the overlay network ON. Here, the predetermined content is content that is selected, as an acquisition target, by a user of the terminal T1-1, for example. The predetermined content is referred to as 'acquisition target content.' The node N1 that executes the retrieval processing is referred to as a 'user node.' In the exemplary embodiment, the user node may be the user terminal UTv or mobile terminal Mq as well as the router Rm. When the user terminal UTv or mobile terminal Mq is the user node, the acquisition target content is selected in the corresponding user node by a user of the user node. Specifically, in the retrieval processing, the user node transmits a content location inquiry message to the root node in accordance with the routing table of the DHT. The location inquiry message is a message for inquiring of the root node about a location of the acquisition target content. The location inquiry message includes a content ID of the acquisition target content and the like. Since the routing table of the DHT is well known in US2008/144636(A1), for example, the detailed descriptions thereof are omitted.

The root node having received the location inquiry message acquires the index information, which corresponds to the content ID included in the location inquiry message, from a storage unit. Then, the root node replies a content location response message to the user node. The location response message is a message for responding the storage node of the acquisition target content to the user node. The location response message includes the acquired index information and the like. When the user node receives the location response message, it extracts the index information from the message. Based on the node ID included in the extracted index information, the user node transmits a storage node retrieval message to the storage node in accordance with the routing of the DHT. The storage node retrieval message is a message for retrieving the storage node having the node ID included in the index information on the overlay network ON. The storage node retrieval message includes the node ID of the storage node that is a retrieval target, and the like. The storage node retrieval message is transmitted among the nodes in accordance with the routing of the DHT based on the node ID of the storage node and is then received in the storage node that is a retrieval target. When the node ID included in the received storage node retrieval message and the node ID of the storage node match each other, the storage node transmits the IP address and the like of the storage node to the user node having transmitted the storage node retrieval message. The user node acquires the acquisition target content by using the received IP address and the like.

When the user node stores the acquired content in the storage unit, it executes publish processing, as a new storage node. The publish processing is processing for disclosing the content storage to the other nodes. In the publish processing, the user node becoming the storage node transmits a publish message to the root node in accordance with the routing table of the DHT. The publish message includes the content ID of the stored content, the node information of the storage node and the like. The root node having received the publish message stores a set of the content ID of the content and the node ID of the storage node included in the publish message, as new index information.

In the meantime, when transmitting the publish message in accordance with the routing table of the DHT, the storage node acquires an IP address of a transmission destination of the publish message from the routing table using the DHT. The publish message transmitted from the storage node may be transmitted by a transmission node (not shown) and then reach the root node. Like the root node, the transmission node stores a set of the content ID and the node ID of the storage node included in the publish message. The transmission node may receive the location inquiry message that has been transmitted from the user node to the root node. In this case, the transmission node may transmit the location response message including the index information corresponding to the acquisition target content to the user node.

In the exemplary embodiment, the node includes a supporter node. Here, the 'supporter node' is a node that normally participates in the delivery system S, like the router Rm, or a contact node that should be first connected when a node participates in the delivery system S.

(3) Configuration and Function of Router

In the below, configurations and functions of the router Rm and the like of the exemplary embodiment are described with reference to FIGS. 2A and 2B.

First, the configuration and function of the router Rm are described with reference to FIG. 2A. As shown in FIG. 2A, the router Rm has a control unit 1, a storage unit 2, a communication unit 3, a buffer memory 4 and the like. The control unit 1, the storage unit 2, the communication unit 3 and the buffer unit 4 are connected to each other via a bus 5. Each router Rm is allotted with an IP address.

The storage unit 2 consists of a hard disk drive and the like, for example. The storage unit 2 stores therein an operating system, a node processing program and the like. The node processing program and the like may be downloaded from a predetermined server connected to the network NW, for example. Alternatively, the node processing program and the like may be recorded in a recording medium and read out through a drive of the recording medium.

The storage unit 2 of the router Rm participating in the overlay network ON stores therein the routing table using the DHT and the index information of the exemplary embodiment. The index information includes a set of the node ID of the content storage node and the content ID of the content. A content storage area of the storage unit 2 stores content. The content storage area is a storage area for storing content. The storage unit 2 stores a transmission source table TB of the exemplary embodiment. The transmission source table TB will be specifically described with reference to FIG. 2B.

The communication unit 3 controls communication with the user terminal UTv and the mobile terminal Mq through the network NW. In this case, the communication with the mobile terminal Mq is performed via the access point APq to which the corresponding mobile terminal Mq is currently connected. The communication unit 3 controls communication with the terminal Tm-s through the base network NLm. The buffer memory 4 buffers the received content.

The control unit 1 consists of a CPU (Central Processing Unit) having a calculation function, a RAM (Random Access Memory) for operation, a ROM (Read Only Memory) and the like. The CPU executes the node processing program stored in the storage unit 2 and the like, so that the control unit 1 of the router Rm operates as a node. The control unit 1 has a function of relaying packets transmitted from the other router Rm and the like. Since the function of relaying the IP packets is the same as the well-known router or L3 switching hub, the detailed descriptions thereof are omitted. The control unit 1 has a function of delivering the content, which is requested from the terminal Tm-s connected through the base network NLm, to the terminal Tm-s. The terminal Tm-s may be configured to participate in the overlay network ON.

In the below, the configurations and functions of the user terminal UTv and the mobile terminal Mq are described. The user terminal UTv and the mobile terminal Mq of the exemplary embodiment basically have the same configuration, respectively. Thus, in the below, the configuration of the user terminal UTv is described on behalf of the user terminal UTv and the mobile terminal Mq. The user terminal UTv has a decoder unit, an image processing unit, a display unit consisting of a liquid crystal display and the like, a voice processing unit, a speaker, an input unit and the like, in addition to the same configuration as that of the router Rm shown in FIG. 2A. The decoder unit, the image processing unit, the display unit, the voice processing unit, the speaker and the input unit are not shown. The control unit 1, the storage unit 2, the communication unit 3, the buffer memory 4, the decoder unit, the image processing unit, the display unit, the voice processing unit and the input unit are connected to each other via the bus 5.

Like the storage unit 2 of the router Rm, the storage unit 2 of the user terminal UTv stores therein an operating system, a node processing program, a routing table, the index information of the exemplary embodiment, content and the transmission source table TB of the exemplary embodiment. The decoder unit of the user terminal UTv performs decode processing such as data expansion or decoding for image data and voice data included in the content. The image processing unit performs predetermined drawing processing for the image data and the like decoded by the decoder unit and reproduces and outputs the same as image signals. The display unit displays an image and the like on a display, based on the image signals reproduced and output from the image processing unit. The display unit displays an image decoded by the decoder unit. The voice processing unit D/A (Digital/Analog) converts the voice data decoded by the decoder unit into analog voice signals, amplifies the converted signals by an amplifier and reproduces and outputs the same. The speaker outputs the voice signals reproduced and output from the voice processing unit, as sound waves. The communication unit 3 controls the communication with the router Rm and the mobile terminal Mq through the network NW. In this case, the communication with the mobile terminal Mq is performed via the access point APq to which the corresponding mobile terminal Mq is currently connected.

The control unit 1 of the user terminal UTv has a CPU having a calculation function, a RAM for operation, a ROM and the like. The CPU executes the node processing program stored in the storage unit 2 and the like, so that the control unit 1 of the user terminal UTv operates as a node.

In the below, the transmission source table TB of the exemplary embodiment is described with reference to FIG. 2B. The transmission source table TB is a table that describes information indicating of a node of a transmission source of one message when the router Rm and the like of the exemplary embodiment receives the message through the overlay network ON. That is, the transmission source table TB is a table that describes information indicating the other nodes that may transmit a message in the future to the node having the transmission source table TB stored therein. As shown in FIG. 2A, the transmission source table TB is stored in the storage unit 2 and the like of the router Rm and the like of the exemplary embodiment. Specifically, as shown in FIG. 213, a set PA of an IP address of a node of a transmission source of each message received through the overlay network ON and the receipt time of the received message is described in the transmission source table TB. The IP address indicates the node of the transmission source of each message and is transmitted with being included in each message. Whenever a message is received, the set PA of the IP address included in the message and the receipt time of the corresponding message is repeatedly described in the transmission source table TB, until the transmission source table TB is refreshed at a timing (which will be described later).

(4) Operations of Delivery System

In the below, operations of the delivery system S of the exemplary embodiment are described with reference to FIGS. 3A to 5C.

(A) Content Acquisition Operation

Figure 3A:
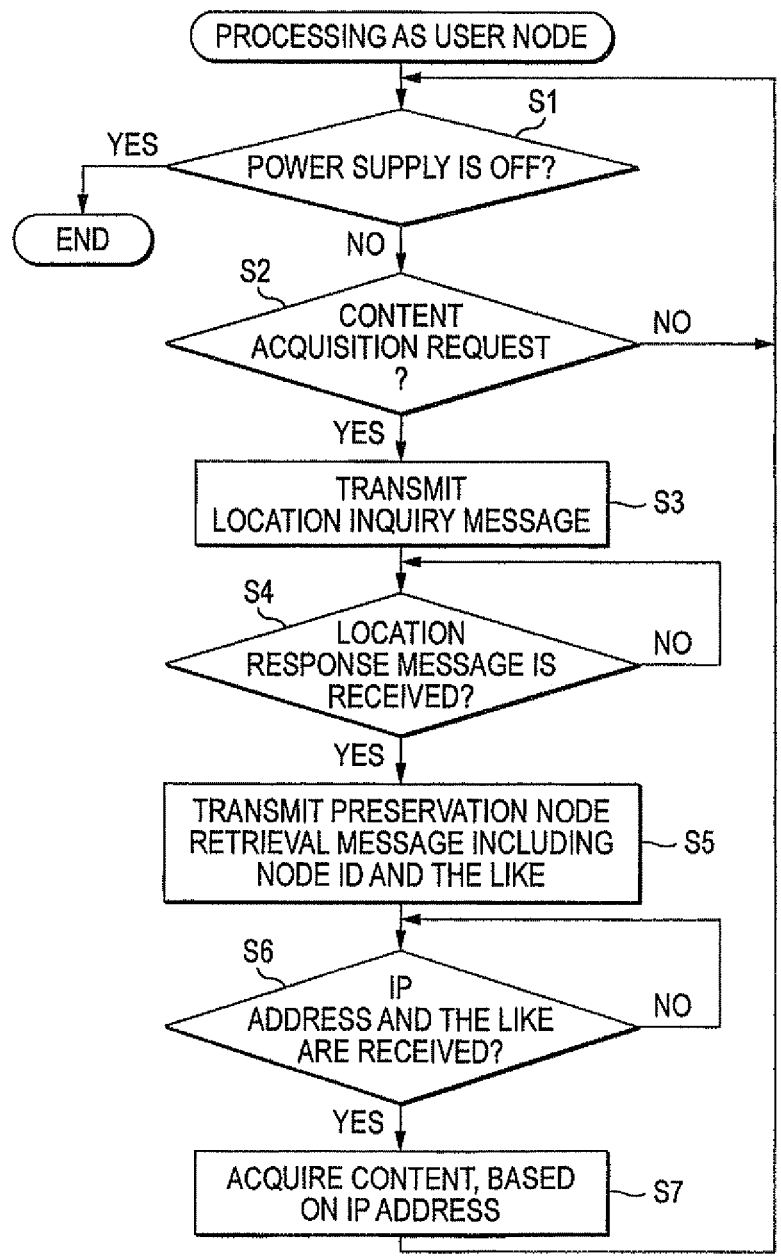
Figure 3B:
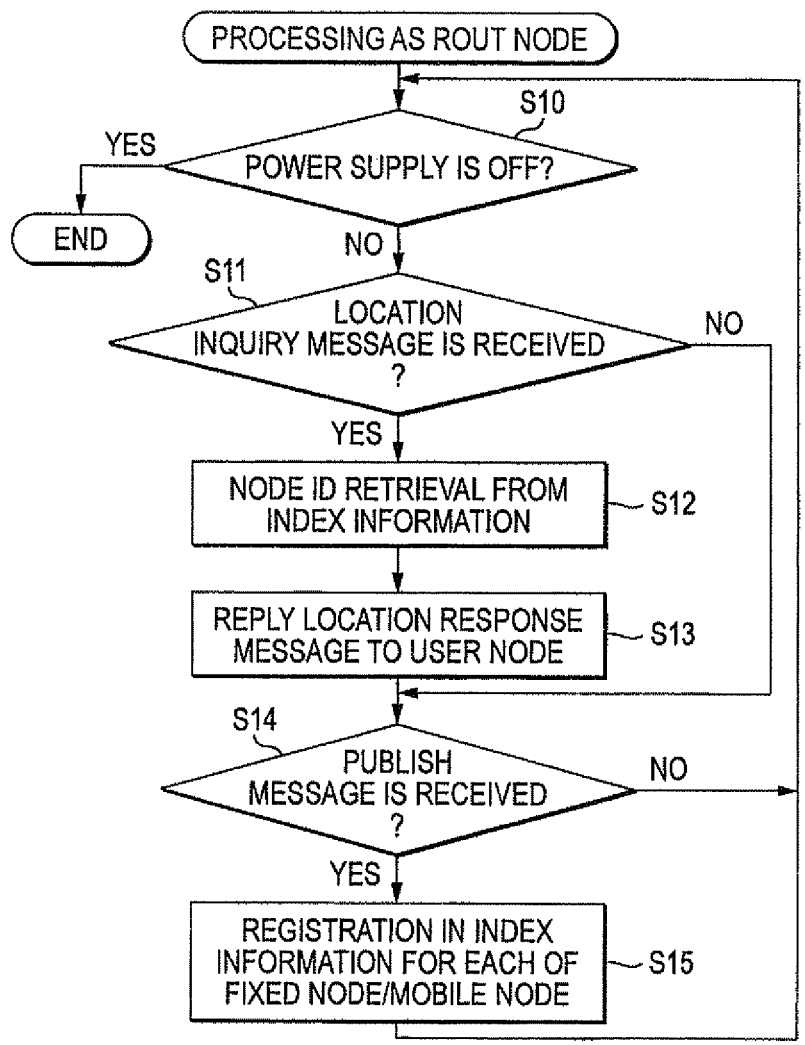
Figure 3C:
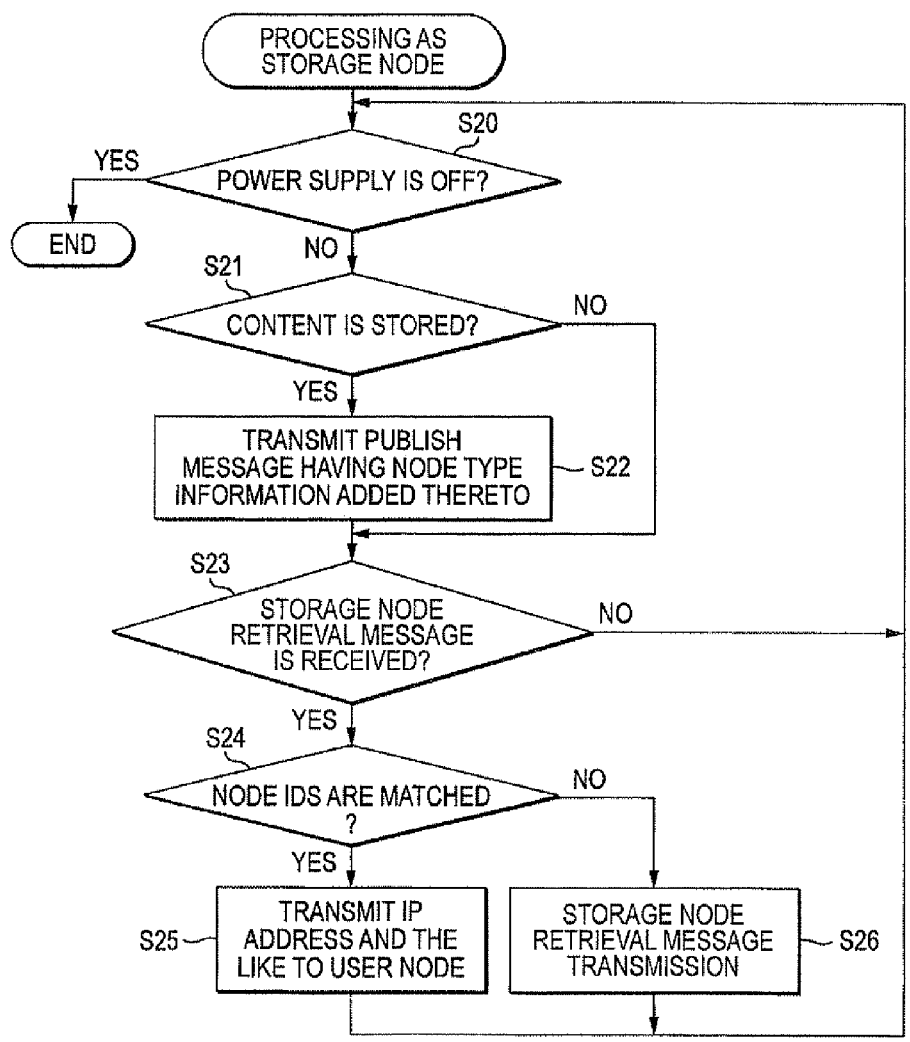

First, content acquisition processing of the exemplary embodiment is described with reference to FIGS. 3A and 3C. Processing of flowcharts shown in FIG. 3 starts when a power supply switch provided to the node becomes ON and thus the node processing program starts up. The processing of the flowcharts shown in FIGS. 3A to 3C is respectively concurrently executed in the node.

(A-1) Processing as User Node

First, the processing as the user node of the exemplary embodiment is described with reference to FIG. 3A. As shown in FIG. 3A, when the node processing program starts up, the control unit 1 of the node determines whether a power supply switch of the node is off, after completing predetermined initialization processing (step S1). In the meantime, the power supply switch of the node is not shown in FIG. 2A or 2B of the exemplary embodiment. When it is determined in the step S1 that the power supply switch is off (step S1: YES), the control unit 1 ends the processing of the exemplary embodiment. When it is determined in the step S1 that the power supply switch is not off (step S1: NO), the control unit 1 determines whether there is a content acquisition request in the node (step S2). Specifically, the control unit 1 determines whether a content selection operation is made in the input unit of the user terminal UTv, for example. When it is determined in the step S2 that there is no content acquisition request (step S2: NO), the control unit 1 proceeds to the step S1. When it is determined in the step S2 that there is a content acquisition request (step S2: YES), the control unit 1 starts processing as the user node. That is, the control unit 1 transmits a location inquiry message of acquisition target content to the root node of the content in accordance with the routing table of the DHT (step S3). The location inquiry message includes the node type information and the like as well as the content ID of the acquisition target content and the IP address and port number of the user node. The node type information indicates whether the user node is a mobile node or fixed node. Then, the control unit 1 determines whether a location response message is received from the root node through the overlay network ON (step S4). The location response message is a response to the location inquiry message transmitted in the step S3. The location response message received in the step S4 includes the index information of the exemplary embodiment including the node ID of the storage node that stores the acquisition target content. When the location response message is not received in the step S4 (step S4: NO), the control unit 1 waits for reception of the location response message. When the location response message is received in the step S4 (step S4: YES), the control unit 1 creates a storage node retrieval message. The storage node retrieval message includes the node ID included in the received location response message, the IP address and port number of the user node and the like. Then, the control unit 1 transmits the created storage node retrieval message to the content storage node in accordance with the routing table of the DHT (step S5). Then, the control unit 1 determines whether an IP address and the like are received from the storage node, as a response to the storage node retrieval message transmitted in the step S5 (step S6). In the step S6, when the IP address and the like are not received (step S6: NO), the control unit 1 waits for reception of the IP address and the like. In the step S6, when the IP address and the like are received (step S6: YES), the control unit 1 acquires the acquisition target content, based on the received IP address and the like (step S7). Specifically, the control unit 1 first accesses the storage node by using the received IP address and port number. Then, the control unit 1 replies a content request message to the storage node. The content request message is a message for requesting the acquisition target content from the storage node. The content request message includes the content ID of the acquisition target content, and the like. When the content request message is received, the control unit 1 of the storage node acquires the content corresponding to the content ID included in the received content request message from the storage unit 2 of the storage node. Then, the control unit 1 of the storage node transmits the acquired content to the user node together with the content transmission message. Like this, the control unit 1 of the user node acquires the content. After that, the control unit 1 of the user node proceeds to the step S1.

(A-2) Processing as Root Node

In the below, the processing as the root node of the exemplary embodiment is described with reference to FIG. 3B. As shown in FIG. 3B, when the node processing program starts up, the control unit 1 of the node determines whether a power supply switch of the node is off, after completing predetermined initialization processing (step S10). When it is determined in the step S10 that the power supply switch is off (step S10: YES), the control unit 1 ends the processing of the exemplary embodiment. When it is determined in the step S10 that the power supply switch is not off (step S10: NO), the control unit 1 determines whether the location inquiry message is received from any one user node (step S11). The location inquiry message is the location inquiry message transmitted in the step S3 of FIG. 3A. In the step S11, when the location inquiry message is not received (step S11: NO), the control unit 1 proceeds to a step S14. In the step S11, when the location inquiry message is received (step S11: YES), the control unit 1 starts the processing as the root node. That is, the control unit 1 retrieves the node ID from the index information stored in the storage unit 2 (step S12). Specifically, the control unit 1 retrieves the node ID, which is associated with the content ID of the acquisition target content included in the received location inquiry message, from the index information. Then, the control unit 1 creates a location response message including the retrieved node ID of the storage node. In this case, when the control unit 1 determines that the user node is a mobile node, based on the node type information, the control unit 1 creates a location response message including the node ID of the storage node that is a fixed node. When the control unit 1 determines that the user node is a fixed node, the control unit 1 creates a location response message including the node ID of the storage node that is a mobile node. When the user node is a mobile node, the control unit 1 may create a location response message including the node ID of the storage node that is a mobile node. When the user node is a fixed node, the control unit may create a location response message including the node ID of the storage node that is a fixed node. Then, the control unit 1 transmits the created location response message to the user node having transmitted the location inquiry message, in accordance with the routing table of the DHT (step S13). Then, the control unit 1 determines whether a publish message from the storage node is received through the overlay network ON (step S14). The publish message includes the content ID of the content stored in the storage node and the node information of the corresponding storage node. The node information includes the node ID, IP address and port number of the storage node and the node type information of the storage node. In the step S14, when the publish message is not received (step S14: NO), the control unit 1 proceeds to the step S10. In the step S14, when the publish message is received (step S14: YES), the control unit 1 registers, as new index information, the content ID and node ID included in the received publish message (step S15). That is, when the control unit 1 determines that the storage node is a fixed node, based on the node type information, the control unit 1 stores, as the new index information, the received content ID and node information of the storage node in the storage unit 2. On the other hand, when the control unit 1 determines that the storage node is a mobile node, based on the node type information, the control unit 1 stores, as the new index information, the node information of the storage node except for the IP address thereof and the content ID in the storage unit 2. When the storage node is a fixed node and when the storage node is a mobile node, the control unit 1 may store, as the new index information, the received content ID and node information of the corresponding storage node in the storage unit 2. After that, the control unit 1 of the root node proceeds to the step S10.

In the meantime, the control unit 1 may transmit the location response message including the node ID of the storage node and the node type information to the user node, instead of the step S13. In this case, the user node having received the location response message may select a storage node. Specifically, when the control unit 1 of the user node 1 having received the location response message determines that the user node is a mobile node, based on the node type information, the control unit 1 acquires the content from the storage node that is a fixed node. When the control unit 1 determines that the user node is a fixed node, the control unit 1 may acquire the content from the storage node that is a mobile node.

In the meantime, regarding the step S13, the control unit 1 may transmit a transmission request message of the acquisition target content to the storage node in accordance with the routing table of the DHT, instead of transmitting the location response message to the user node. The transmission request message is a message for requesting the storage node to transmit the acquisition target content to the user node. The transmission request message includes the content ID of the acquisition target content. Further, the transmission request message includes the node ID of the storage node that stores the acquisition target content, the IP address and port number of the user node included in the location inquiry message, and the like. The transmission request message is transmitted among the nodes in accordance with the routing of the DHT based on the node ID of the storage node. Then, the transmitted transmission request message is received in the storage node. The control unit 1 of the storage node having received the transmission request message acquires the content corresponding to the content ID included in the message from the storage unit 2 of the storage unit 2. The control unit 1 of the storage node accesses the user node, based on the IP address and the like of the user node included in the transmission request message. Then, the control unit 1 of the storage node transmits the acquisition target content to the user node together with the content transmission message.

(A-3) Processing as Storage Node

In the below, the processing as the storage node of the exemplary embodiment is described with reference to FIG. 3C. As shown in FIG. 3C, when the node processing program starts up, the control unit 1 of the node determines whether a power supply switch of the node is off after completing predetermined initialization processing (step S20). When it is determined in the step S20 that the power supply switch is off (step S20: YES), the control unit 1 ends the processing of the exemplary embodiment. When it is determined in the step S20 that the power supply switch is not off (step S20: NO), the control unit 1 determines whether new content submitted to the delivery system S is stored in the node having the control unit 1 (step S21). The 'submission' of content means that the content is stored in any one of the nodes and is left to be acquired through the overlay network ON. When it is determined in the step S21 that new content is not stored (S21: NO), the control unit 1 proceeds to a step S23. When it is determined in the step S21 that new content is stored (S21: YES), the control unit 1 starts the processing as the storage node. That is, the control unit 1 creates a publish message for the new content. The publish message includes the content ID of the newly stored content, the node information of the storage node having stored the content newly and the node type information of the storage node. The control unit 1 transmits the created publish message to the root node in accordance with the routing table of the DHT (step S22). Then, the control unit 1 determines whether the storage node retrieval message is received from any one of the user nodes (step S23). The storage node retrieval message is the storage node retrieval message transmitted in the step S5 of FIG. 3A. When it is determined in the step S23 that the storage node retrieval message is not received (step S23: NO), the control unit 1 proceeds to the step S20. When it is determined in the step S23 that the storage node retrieval message is received (step S23: YES), the control unit 1 determines whether the stored node ID of the storage node matches the node ID included in the received storage node retrieval message (step S24). When it is determined in the step S24 that they do not match each other (step S24: NO), the control unit 1 transmits the received storage node retrieval message to the other node in accordance with the routing table of the DHT (step S26). Then, the control unit 1 proceeds to the step S20. When it is determined in the step S24 that they match each other (step S24: YES), the control unit 1 transmits the stored IP address, port number and the like of the storage node to the user node that is the transmission source of the received storage node retrieval message (step S25). In this case, the IP address of the user node included in the received storage node retrieval message is used. The IP address and the like are received by the user node and used to acquire the content (refer to the step S7 of FIG. 3A). After that, the control unit 1 proceeds to the step S20.

(B) Operations Accompanied by IP Address Change

In the below, processing of the exemplary embodiment accompanied by the IP address change of the mobile terminal Mg is described with reference to FIGS. 4A to 5C. In the meantime, processing of flowcharts shown in FIGS. 4A to 5C starts when a power supply switch provided to the node becomes ON and thus the node processing program starts up. The processing of the flowcharts shown in FIGS. 4A to 5C is respectively concurrently executed in the node.

(B-1) Transmission Source Table Update Processing

Figure 4A:
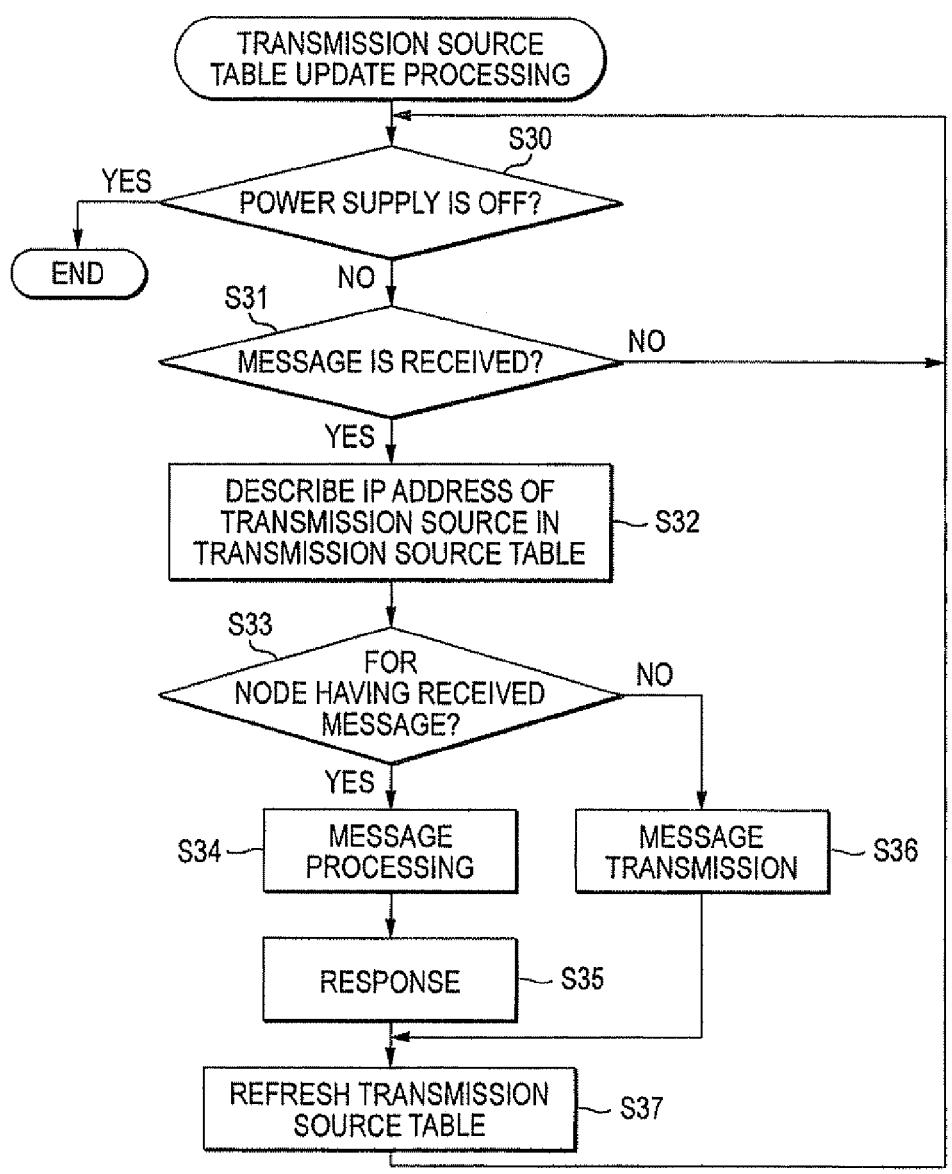

First, transmission source table update processing of the exemplary embodiment is described with reference to FIG. 4A. As shown in FIG. 4A, when the node processing program starts up, the control unit 1 of the node determines whether a power supply switch of the node is off after completing predetermined initialization processing (step S30). When it is determined in the step S30 that the power supply switch is off (step S30: YES), the control unit 1 ends the transmission source table update processing of the exemplary embodiment. When it is determined in the step S30 that the power supply switch is not off (step S30: NO), the control unit 1 determines whether a message is received through the overlay network ON (step S31). When it is not determined in the step S31 that a message is received (step S31: NO), the control unit 1 proceeds to the step S30. When it is determined in the step S31 that a message is received (step S31: YES), the control unit 1 associates and stores the IP address of the node of the transmission source of the received message and receipt time of the received message in the transmission source table TB as PA (step S32, refer to FIG. 2B). Then, the control unit 1 determines whether the received message is a message that has been transmitted for the node having received the message (step S33). Specifically, the control unit 1 checks contents of a header of the received message, for example, thereby determining whether a destination of the message is the node having received the message. When it is determined in the step S33 that a destination of the received message is not the node having received the message (step S33: NO), the control unit 1 transmits the received message to the node in accordance with the routing of the DHT (step S36). Then, the control unit 1 proceeds to a step S37. When it is determined in the step S33 that a destination of the received message is the node having received the message (step S33: YES), the control unit 1 performs processing corresponding to the received message (step S34). Then, the control unit 1 performs response processing to the received message by using the processing result of the step S34 (step S35). Then, the control unit 1 refreshes the transmission source table TB (step S37). Specifically, as the refresh processing, the control unit 1 deletes the IP address from the transmission source table TB. Specifically, for example, the control unit 1 refers to the receipt time described in the transmission source table TB and deletes the IP address of the receipt time that predetermined time has elapsed from current time. When the number of the IP addresses registered in the transmission source table TB exceeds a predetermined number, the control unit 1 may sequentially delete the IP addresses from the IP address of the older receipt time. After that, the control unit 1 proceeds to the step S30.

(B-2) Address Change Message Transmission Processing

Figure 4B:
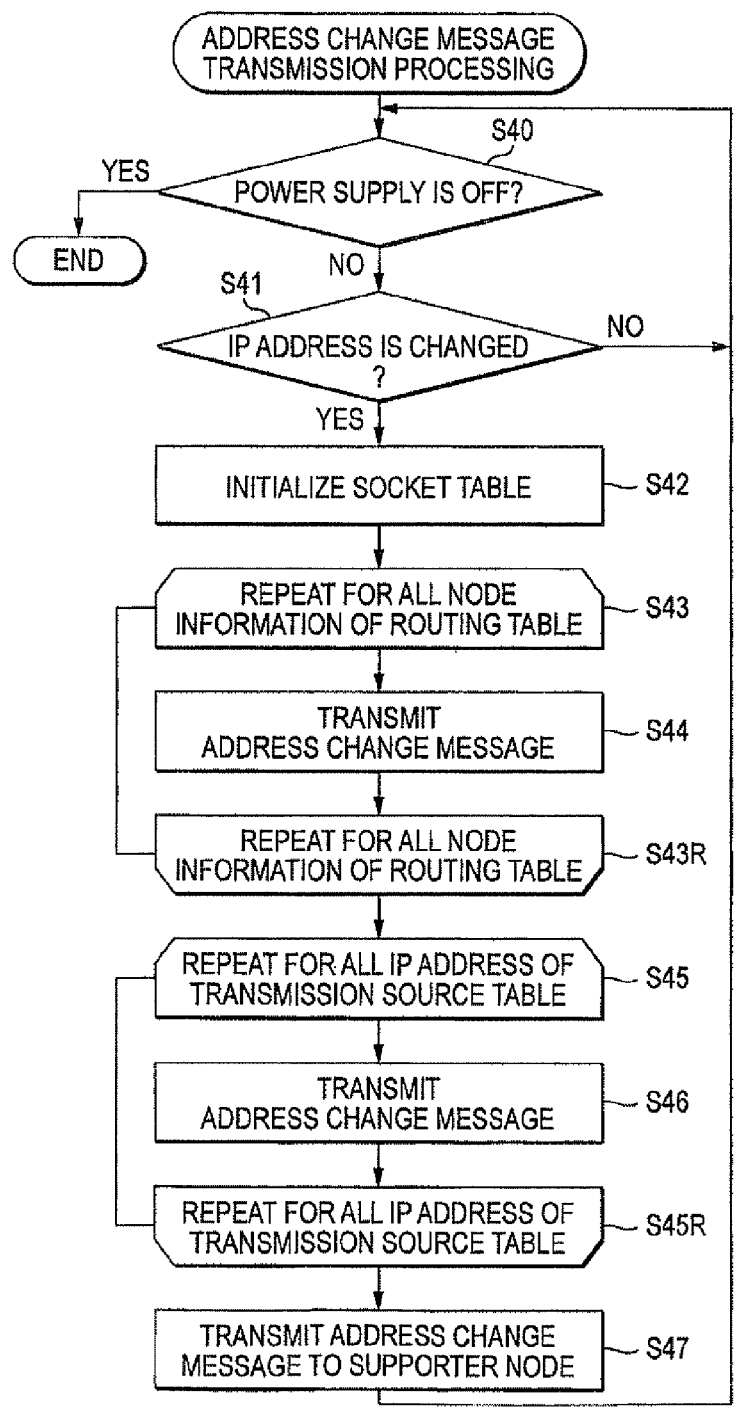

In the below, address change message transmission processing of the exemplary embodiment is described with reference to FIG. 4B. As shown in FIG. 4B, when the node processing program starts up, the control unit 1 of the node determines whether a power supply switch of the node is off, after completing predetermined initialization processing (step S40). When it is determined in the step S40 that the power supply switch is off (step S40: YES), the control unit 1 ends the address change message transmission processing of the exemplary embodiment. When it is determined in the step S40 that the power supply switch is not off (step S40: NO), the control unit 1 determines whether the IP address of the node is changed (step S41). Specifically, the control unit 1 detects the change of the IP address when connecting to the other node. For example, the control unit 1 of the mobile terminal Mg executes a router search process of IPv4 among the access points APq, so that the control unit 1 can detect that the global IP address is changed as the access point APq is changed. The router search process is performed by using a router advertisement message and a router solicitation message of IPv4, for example. When it is determined in the step S41 that the IP address is not changed (step S41: NO), the control unit 1 proceeds to the step S40. When the IP address is changed (step S41: YES), the control unit 1 initializes a socket table (not shown) that is stored in the storage unit 2 (step S42). Here, the 'socket table' is a table in which session information, which indicates the past established connection from a node to other nodes, is registered. The control unit 1 repeats processing of transmitting an address change message, which indicates that the IP address has been changed, to all the nodes registered in the routing table using the DHT stored in the storage unit 2 (steps S43, S44 and S43R). Specifically, the control unit 1 first extracts one node information from the routing table. Then, the control unit transmits the address change message to the node of the extracted node information (step S44). In the address change message, transmission time is described in the header thereof. The address change message includes the node ID of the node, the IP address before the change and the current IP address after the change. The address change message is directly transmitted to the node of the IP address by using the IP address included in the node information extracted from the routing table, regardless of the routing table of the DHT. The control unit 1 repeats the processing of the steps S43, S44 and S43R for all the nodes described in the routing table. Then, the control unit 1 repeats processing of transmitting the address change message to all the nodes whose IP addresses are described in the transmission source table TB stored in the storage unit 2 (steps S45, S46 and S45R). Specifically, the control unit 1 first extracts one IP address from the transmission source table TB. Then, the control unit 1 transmits to the node having the extracted IP address the same address change message as the address change message transmitted in the step S44 (step S46). The address change message is also directly transmitted to the node of the IP address by using the IP address extracted from the transmission source table TB, regardless of the routing table of the DHT. The control unit 1 repeats the processing of the steps S45, S46 and S45R for all the nodes registered in the transmission source table TB. Then, the control unit 1 transmits to the supporter node the same address change message as the address changed message transmitted in the step S44 or S36 (step S47). After that, the control unit 1 proceeds to the step S40. Here, the IP address of the supporter node is little changed, compared to the mobile terminal Mg, for example. In the node that executes the processing shown in FIG. 4B, the IP address of the supporter node is stored in the storage unit 2. The control unit 1 directly transmits the address change message to the supporter node of the stored IP address, regardless of the routing table of the DHT (step S47). In addition to this, the control unit 1 may transmit the address change message to the node whose session information is registered in the socket table.

(B-3) Address Change Message Reception Processing

Figure 5A:
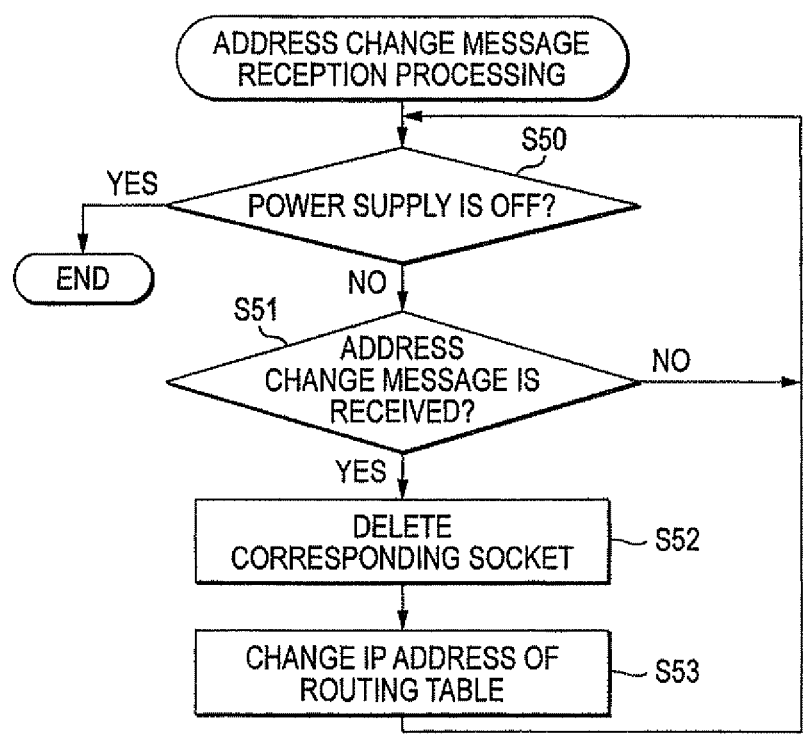

In the below, address change message reception processing of the exemplary embodiment is described with reference to FIG. 5A. The address change message is the address change message transmitted in the step S44 or S46 of FIG. 4B. As shown in FIG. 5A, when the node processing program starts up, the control unit 1 of the node determines whether a power supply switch of the node is off, after completing predetermined initialization processing (step S50). When it is determined in the step S50 that the power supply switch is off (step S50: YES), the control unit 1 ends the address change message reception processing of the exemplary embodiment. When it is determined in the step S50 that the power supply switch is not off (step S50: NO), the control unit 1 determines whether the address change message is received from any one of the other nodes (step S51). In the step S51, when the address changed message is not received (S51: NO), the control unit 1 proceeds to the step S50. In the step S51, when the address changed message is received (S51: YES), the control unit 1 deletes a socket, which corresponds to the IP address before the change included in the received address change message, from the socket table (step S52). The control unit 1 changes the IP address of the routing table stored in the storage unit 2, which IP address is associated with the node ID included in the address change message, into the IP address after the change (step S53). After that, the control unit proceeds to the step S50.

(B-4) Address Information Reception Processing

Figure 5B:
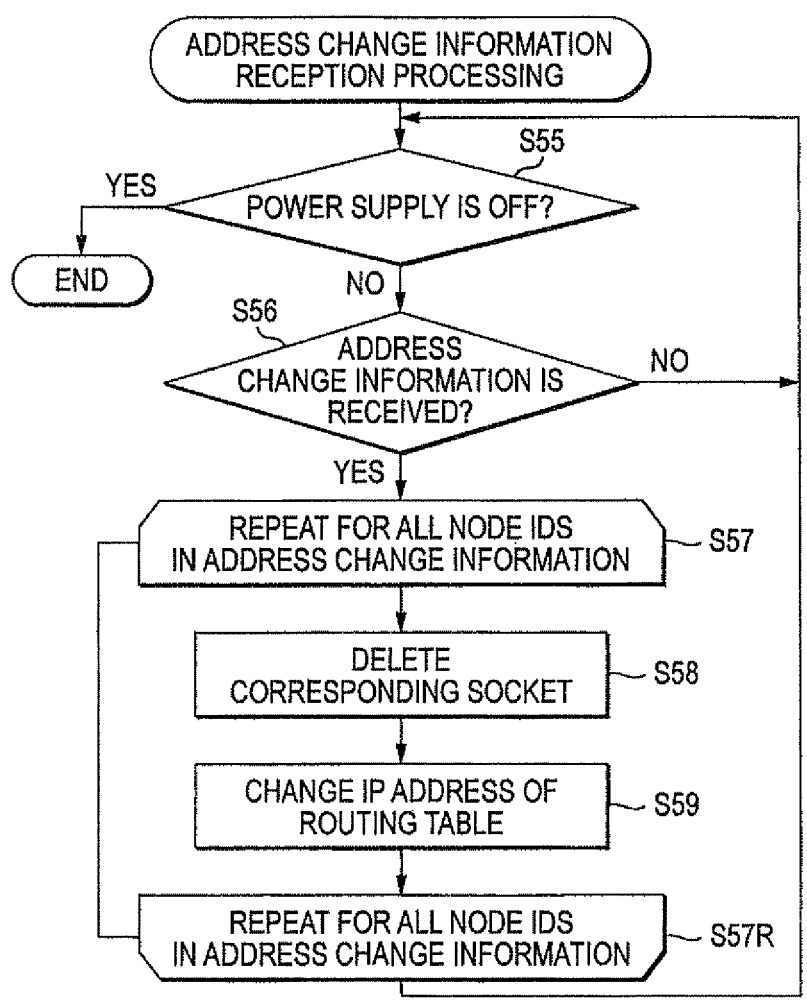

In the below, address change information reception processing of the exemplary embodiment is described with reference to FIG. 5B. As shown in FIG. 5B, when the node processing program starts up, the control unit 1 of the node determines whether a power supply switch of the node is off, after completing predetermined initialization processing (step S55). When it is determined in the step S55 that the power supply switch is off (step S55: YES), the control unit 1 ends the address change information reception processing of the exemplary embodiment. When it is determined in the step S55 that the power supply switch is not off (step S55: NO), the control unit 1 determines whether the address change information is received from any one of the supporter nodes of the exemplary embodiment (step S56). As the address change information, the node IDs of the nodes whose IP addresses are changed, the IP addresses before the change and the IP addresses after the change are associated. In the step S56, when the address change information is not received (step S56: NO), the control unit 1 proceeds to the step S55. In the step S56, when the address change information is received (step S56: YES), the control unit 1 repeats processing of steps S58 and S59 for all the node IDs included in the received address change information (step S57, S58, S59 and S57R). Specifically, the control unit 1 first extracts one node ID from the received address change information. Then, the control unit 1 deletes a socket, which corresponds to the IP address before the change corresponding to the extracted node ID, from the socket table (step S58). Then, the control unit 1 changes the IP address of the node information including the extracted node ID of the node information registered in the routing table stored in the storage unit 2 into the IP address after the change (step S59). The processing of the steps S57, S58, S59 and S57R is repeated for all the node IDs included in the address change information. After that, the control unit 1 proceeds to the step S55.

(B-5) Processing as Supporter Node

Figure 5C:
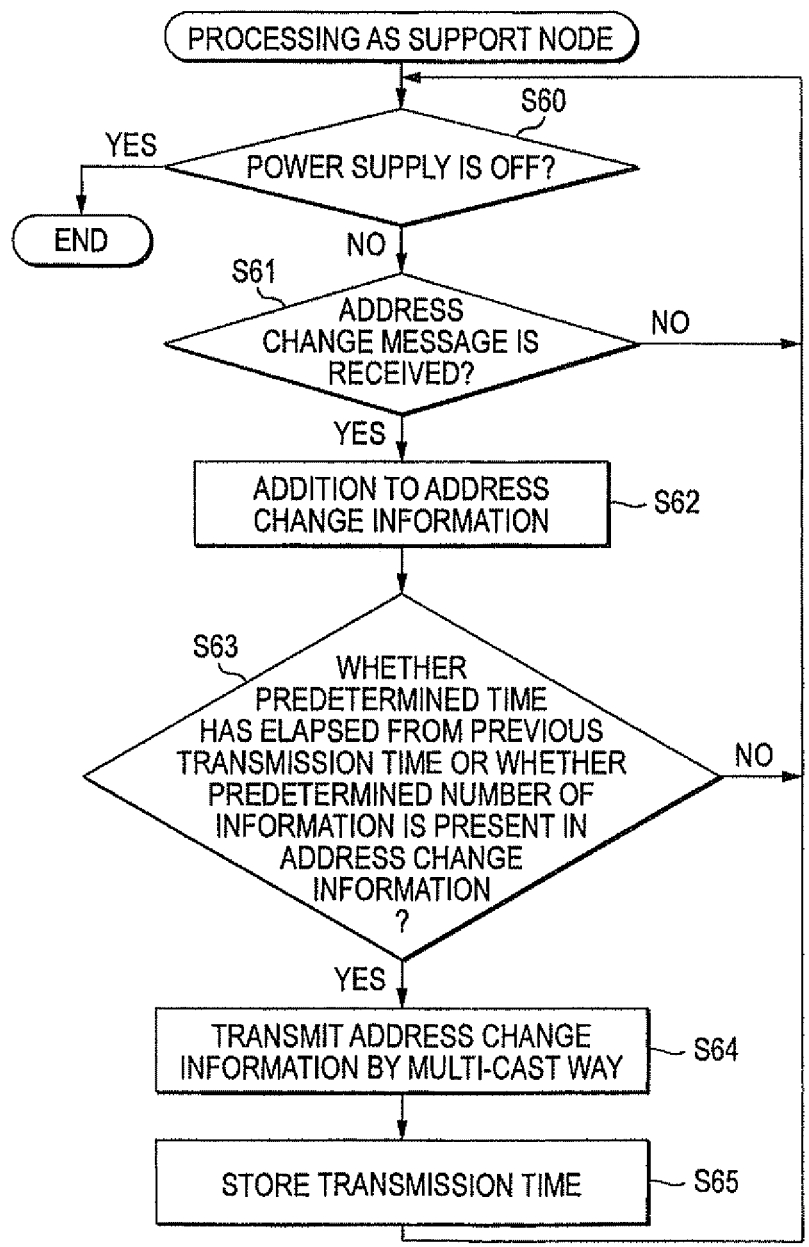

Finally, the processing as the supporter node of the exemplary embodiment is described with reference to FIG. 5C. As shown in FIG. 5C, when the node processing program starts up, the control unit 1 of the supporter node determines whether a power supply switch of the node is off, after completing predetermined initialization processing (step S60). When it is determined in the step S60 that the power supply switch is off (step S60: YES), the control unit 1 ends the processing as the supporter node of the exemplary embodiment. When it is determined in the step S60 that the power supply switch is not off (step S60: NO), the control unit 1 determines whether the address change message is received from any one of the other nodes (step S61). The address change message is the address change message transmitted in the step S47 shown in FIG. 4B. In the step S61, when the address change message is not received (step S61: NO), the control unit 1 proceeds to the step S60. In the step S61, when the address change message is received (step S61: YES), the control unit 1 adds the information included in the received address change message to the address change information (step S62). Specifically, the control unit 1 adds the node ID, the IP address before the change and the IP address after the change included in the received address change message to the address change information. The address change information is then stored in the storage unit 2 of the supporter node. Then, the control unit 1 determines whether predetermined time has elapsed from the previous transmission time of the address change information or whether the IP addresses of the predetermined number of nodes are included in the address change information (step S63). When all the conditions of step S63 are not satisfied (step S63: NO), the control unit 1 proceeds to the step S60. When any one of the conditions of the step S63 is not satisfied (step S63: YES), the control unit 1 transmits the address change information stored in the storage unit 2 to the other nodes by a multi-cast way (step S64). That is, the control unit 1 collectively notifies the other nodes of the address change information. Since the transmission by the multi-cast way is well known in US2008/144636(A1), for example, the detailed descriptions thereof are omitted. The control unit 1 stores the transmission time of the address change information of the step S64 in the storage unit 2 (step S65). Then, the control unit 1 proceeds to the step S60.

As described above, the delivery system S of the exemplary embodiment can acquire the content without increasing the amount of messages in the overlay network ON even when the IP address of the storage node is frequently changed. As shown in the steps S44, S46 and S47 of FIG. 4B, the delivery system S transmits the address change message indicating the IP address after the change into the connectable node. By minimizing the transmission range of the address change message including the IP address after the change, the delivery system S can suppress the amount of messages in the overlay network ON. As shown in the steps S63 and S64 of FIG. 5C, the delivery system S transmits the address change information collectively including the IP addresses after the change from the supporter node by the multi-cast way, based on the preset condition. Compared to the configuration in which the IP address is notified to the other nodes whenever the IP address is changed, the delivery system S can suppress the amount of messages in the overlay network ON. Based on the node type information included in the publish message, the delivery system S determines whether the storage node having transmitted the publish message is a fixed node or mobile node. The delivery system S can securely determine the type of the storage node, based on the node type information, thereby changing the acquisition method of the content.

Meanwhile, in the above exemplary embodiment, the node ID of the storage node is included in the location response message, regardless of whether the storage node is a fixed node or mobile node. Instead of this configuration, the control unit 1 of the root node may enable the node ID to be included in the location response message when the storage node is a mobile node and the IP address to be included in the location response message when the storage node is a fixed node. When the storage node is a fixed node, the control unit 1 of the user node may acquire the content from the storage node by using the IP address included in the received location response message. In this case, when the storage node is a fixed node, the storage node can be retrieved by the IP address of the user node. Since the node ID of the storage node, which is a fixed node, is not retrieved, it is possible to further suppress the amount of messages in the overlay network ON.

In the above exemplary embodiment and modified embodiments, the overlay network ON using the DHT is applied to the delivery system S. However, the invention is not limited thereto. For example, a delivery system to which another P2P (Pear to Pear) type network or an overlay network not using the DHT is applied may be used. The overlay network not using the DHT includes a hybrid type overlay network, for example.

What is claimed is:

1. An information communication system in which an overlay network is configured by a plurality of information processing apparatuses capable of communicating with each other through a network, the plurality of information processing apparatuses each including a controller configured to control the respective information processing apparatus, content being distributed and stored in the plurality of information processing apparatuses, and apparatus identification information that identifies the information processing apparatuses is allotted to each of the respective information processing apparatuses, the plurality of the information communication apparatuses comprising:

a first information processing apparatus configured to request the content;

a second information processing apparatus configured to store the content; and a third information processing apparatus, the controller of the third information processing apparatus being configured to:

receive a retrieval message transmitted from the first information processing apparatus, the retrieval message including content identification information for identifying the content in the overlay network and location information indicating a location of the first information processing apparatus on the overlay network;

associate and store the apparatus identification information of the second information processing apparatus and the content identification information of the content stored in the second information processing apparatus in a storage unit; and transmit the apparatus identification information, which is stored in the storage unit in association with the content identification information included in the received retrieval message, and wherein the controller of the second information processing apparatus is configured to:

receive the apparatus identification information from the third information processing apparatus;

determine whether the received apparatus identification information matches the apparatus identification information of the second information processing apparatus; and allow the first information processing apparatus to acquire the content stored in the second information processing apparatus in response to determining that the received apparatus identification information matches the apparatus identification information of the second information processing apparatus.

2. The information communication system according to claim 1, wherein the controller of the second information processing apparatus is configured to transmit the location information, which indicates a location of the second information processing apparatus on the overlay network, to the first information processing apparatus in response to determining that the received apparatus identification information matches the apparatus identification information of the second information processing apparatus, and the controller of the first information processing apparatus is configured to acquire the content by using the location information transmitted by the second information processing apparatus.

3. The information communication system according to claim 1, each information processing apparatus further comprising:

a location information storage unit configured to store therein the location information indicating a location of the respective information processing apparatus on the network; and the controller of each information processing apparatus being configured to:

determine whether the location information indicating the location of the respective information processing apparatus is changed, and notify the respective information processing apparatus of the location information after the change, the information processing apparatus being indicated by the location information stored in the location information storage unit, in response to determining that the location information is changed.

4. The information communication system according to claim 1, wherein the controller of each information processing apparatus being configured to:

receive the location information after the change from the respective information processing apparatus whose location information indicating the location thereof on the network is changed; and notify collectively at least one of the information processing apparatuses of the received location information, based on a preset condition.

5. The information communication system according to claim 1, wherein the second information processing apparatus is a mobile terminal to be carried or a fixed terminal that is provided and used at a predetermined place, and the controller of the third information processing apparatus is configured to:

receive a publish message indicating that the content is stored from the second information processing apparatus;

determine whether the second information processing apparatus transmitted the publish message is the fixed terminal or the mobile terminal, based on the received publish message;

associate and stores the apparatus identification information of the mobile terminal transmitted the publish message and the content identification information of the content published by the publish message in the storage unit in response to determining that the mobile terminal transmitted the publish message;

associate and stores location information indicating a location of the fixed terminal transmitted the publish message on the network and the content identification information of the content published by the publish message in the storage unit in response to determining that the fixed terminal transmitted the publish message; and transmit the location information of the identified fixed terminal to the first information processing apparatus.

6. The information communication system according to claim 5, wherein the publish message includes second identification information indicating whether the second information processing apparatus transmitted the publish message is the fixed terminal or the mobile terminal, and the controller of the third information processing apparatus is configured to determine whether the second information processing apparatus transmitted the publish message is the fixed terminal or the mobile terminal, based on the second identification information included in the received publish message.

7. An information communicating apparatus provided in information communication system in which an overlay network is configured by a plurality of information processing apparatuses capable of communicating with each other through a network, content being distributed and stored in the plurality of information processing apparatuses, and apparatus identification information that identifies the information processing apparatuses is allotted to each of the information processing apparatuses, the plurality of information processing apparatuses including: (i) a first information processing apparatus configured to request the content; and (ii) a second information processing apparatus including: (a) a storage unit configured to associate and store the apparatus identification information of the information communicating apparatus and content identification information for identifying the content, which is stored in the information communicating apparatus, in the overlay network; (b) a first reception unit configured to receive a retrieval message from the first information processing apparatus, the retrieval message including the content identification information and location information indicating a location of the first information processing apparatus on the overlay network; and (c) a transmission unit configured to transmit, to one of the first information processing apparatus and the information communicating apparatus, the apparatus identification information of the apparatus identification information stored in the storage unit, which corresponds to the content identification information included in the retrieval message received by the first reception unit, the information communicating apparatus comprising:

a controller configured to:
receive the apparatus identification information from the second information processing apparatus;
determine whether the apparatus identification information received by the second reception unit matches the apparatus identification information of the second information processing apparatus; and
allow the first information processing apparatus to acquire the content stored in the second information processing apparatus in response to the controller determining that the apparatus identification information received by the controller matches the apparatus identification information of the second information processing apparatus.

8. A non-transitory computer readable recording medium storing a program for an information processing system in which an overlay network is configured by a plurality of information processing apparatuses capable of communicating with each other through a network, each information processing apparatus including a controller configured to control the respective information processing apparatus, content being distributed and stored in the plurality of information processing apparatuses, apparatus identification information that identifies the information processing apparatuses is allotted to each of the information processing apparatuses, the plurality of information processing apparatuses including: (i) a first information processing apparatus that requests the content, (ii) a second information processing apparatus that stores the content, and (iii) a third information processing apparatus, the controller of the third information processing apparatus being configured to: (a) associate and store, in a storage unit, the apparatus identification information of the second information processing apparatus and content identification information for identifying the content, which is stored in the second information processing apparatus, in the overlay network; (b) receive a retrieval message from the first information processing apparatus, the retrieval message including the content identification information and location information indicating a location of the first information processing apparatus on the overlay network; (c) and transmit the apparatus identification information of the apparatus identification information stored in the storage unit, which corresponds to the content identification information included in the retrieval message received by a first reception unit, to the first information processing apparatus or second information processing apparatus, the program causing a computer of the second information processing apparatus to execute steps comprising:

receiving the apparatus identification information from the third information processing apparatus;
determining whether the received apparatus identification information matches the apparatus identification information of the second information processing apparatus, and
allowing the first information processing apparatus to acquire the content stored in the second information processing apparatus in response to the determination that the received apparatus identification information matches the apparatus identification information of the second information processing apparatus.

9. An information communication method executed by an information processing system in which an overlay network is composed of a plurality of information processing apparatuses capable of communicating with each other through a network, content being distributed and stored in the plurality of information processing apparatuses, apparatus identification information identifying the information processing apparatuses being allotted to each of the information processing apparatuses, the plurality of information processing apparatuses including: (i) a first information processing apparatus that requests the content, (ii) a second information processing apparatus that stores the content, and (iii) a third information processing apparatus having a storage unit configured to associate and store the apparatus identification information of the second information processing apparatus and the content identification information of the content stored in the second information processing apparatus, the method comprising:

receiving, by the third information processing apparatus, a retrieval message that is transmitted from the first information processing apparatus and includes content identification information for identifying the content in the overlay network and location information indicating a location of the first information processing apparatus on the overlay network;
transmitting, by the third information processing apparatus, the apparatus identification information, which is stored in the storage unit in association with the content identification information included in the received retrieval message, to the first information processing apparatus or second information processing apparatus;
receiving, by the second information processing apparatus, the apparatus identification information from the third information processing apparatus;
determining, by the second information processing apparatus, whether the received apparatus identification information matches the apparatus identification information of the second information processing apparatus; and
allowing the first information processing apparatus to acquire the content stored in the second information processing apparatus, the control process being executed in the second information processing apparatus in response to the determination that the received apparatus identification information matches the apparatus identification information of the second information processing apparatus.

* * * * *